(12) United States Patent
Hoffner et al.

(10) Patent No.: US 9,533,473 B2
(45) Date of Patent: Jan. 3, 2017

(54) CHIP CARD SUBSTRATE AND METHOD OF FORMING A CHIP CARD SUBSTRATE

(71) Applicant: Infineon Technologies AG, Neubiberg (DE)

(72) Inventors: Siegfried Hoffner, Nesselwang (DE); Mohammed Reza Hussein, Regensburg (DE); Frank Pueschner, Kelheim (DE); Thomas Spoettl, Mintraching (DE)

(73) Assignee: Infineon Technologies AG, Neubiberg (DE)

( * ) Notice: Subject to any disclaimer, the term of this patent is extended or adjusted under 35 U.S.C. 154(b) by 15 days.

(21) Appl. No.: 14/243,970

(22) Filed: Apr. 3, 2014

(65) Prior Publication Data

US 2015/0283794 A1 Oct. 8, 2015

(51) Int. Cl.
| | |
|---|---|
| B32B 27/08 | (2006.01) |
| B32B 27/36 | (2006.01) |
| B32B 37/24 | (2006.01) |
| B32B 27/30 | (2006.01) |
| B32B 27/32 | (2006.01) |
| B32B 3/26 | (2006.01) |
| B32B 7/12 | (2006.01) |
| B32B 37/12 | (2006.01) |
| B32B 27/20 | (2006.01) |
| B32B 37/14 | (2006.01) |

(52) U.S. Cl.
CPC ............... *B32B 27/08* (2013.01); *B32B 3/26* (2013.01); *B32B 7/12* (2013.01); *B32B 27/20* (2013.01); *B32B 27/304* (2013.01); *B32B 27/32* (2013.01); *B32B 27/322* (2013.01); *B32B 27/36* (2013.01); *B32B 27/365* (2013.01); *B32B 37/12* (2013.01); *B32B 37/24* (2013.01); *B32B 37/142* (2013.01); *B32B 2037/243* (2013.01); *B32B 2255/10* (2013.01); *B32B 2255/26* (2013.01); *B32B 2264/105* (2013.01); *B32B 2307/202* (2013.01); *B32B 2329/04* (2013.01); *B32B 2379/08* (2013.01); *B32B 2425/00* (2013.01); *Y10T 156/10* (2015.01); *Y10T 428/24998* (2015.04)

(58) Field of Classification Search
CPC ............ B32B 2425/00; B32B 2519/02; Y10T 428/249991; Y10T 428/249992
See application file for complete search history.

(56) References Cited

U.S. PATENT DOCUMENTS

| | | | |
|---|---|---|---|
| 6,803,114 B1 * | 10/2004 | Vere | G06K 19/07722 156/308.2 |
| 2004/0105971 A1 * | 6/2004 | Parrinello | B41M 5/52 428/317.9 |
| 2004/0159709 A1 * | 8/2004 | Ohta | G06K 19/077 235/492 |

(Continued)

*Primary Examiner* — Hai Vo
(74) *Attorney, Agent, or Firm* — Viering, Jentschura & Partner mbB

(57) ABSTRACT

A chip card substrate is provided that includes a first polymer layer including a first polymer material. The chip card substrate further includes an intermediate layer disposed over the first polymer layer and including polyolefin including a plurality of micro pores, an adhesive layer disposed over the intermediate layer and including an adhesive, and a second polymer layer disposed over the adhesive layer and including a second polymer material different from the first polymer material.

12 Claims, 4 Drawing Sheets

(56) References Cited

U.S. PATENT DOCUMENTS

2009/0020615 A1* 1/2009 Patel .................... G06K 19/077
  235/492
2009/0303011 A1* 12/2009 Ogata .............. G06K 19/07722
  340/10.1
2011/0024511 A1* 2/2011 Rietzler ................ B32B 37/142
  235/492

* cited by examiner

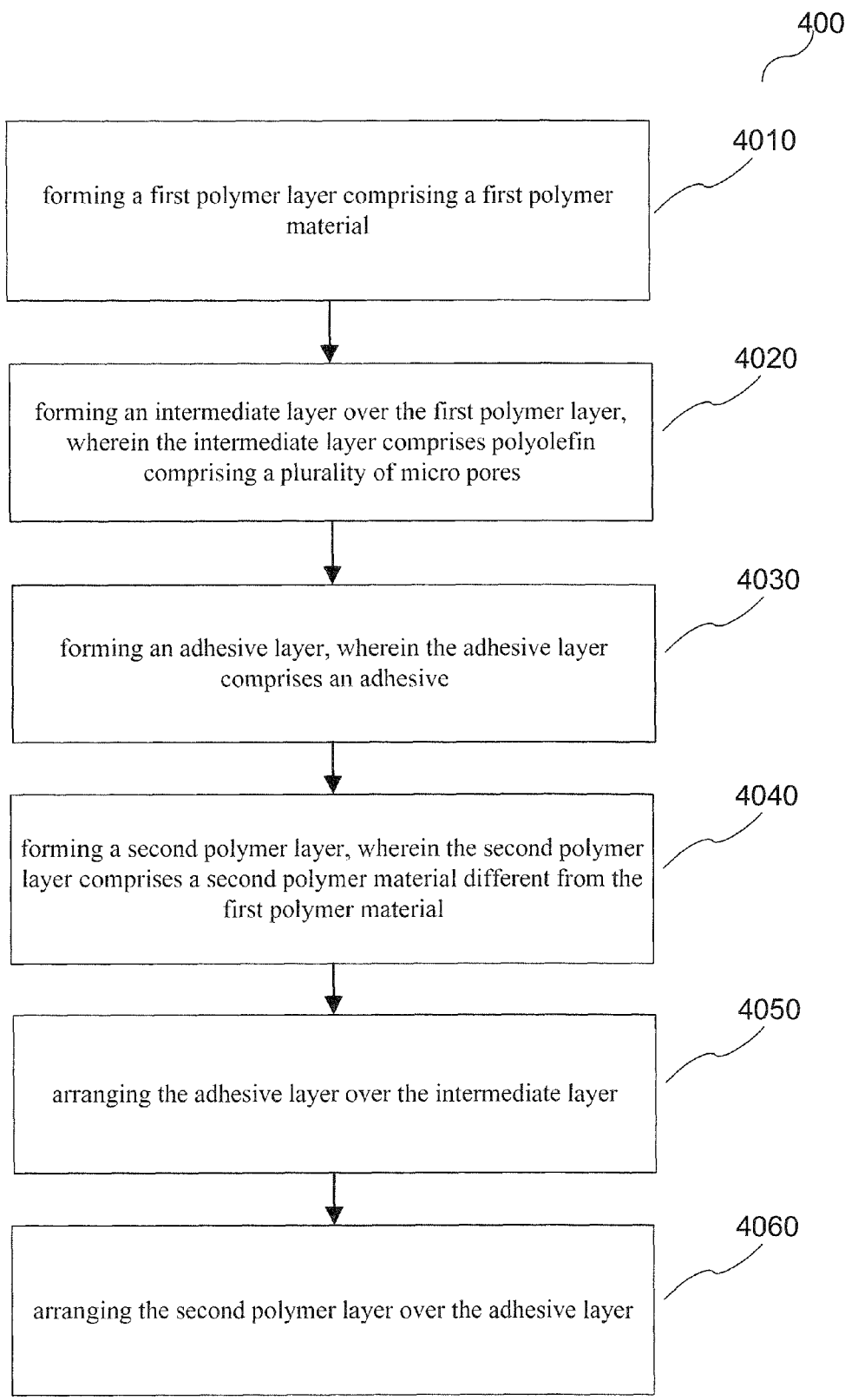

CHIP CARD SUBSTRATE AND METHOD OF FORMING A CHIP CARD SUBSTRATE

TECHNICAL FIELD

Various embodiments generally relate to a chip card substrate and to a method of forming a chip card substrate.

BACKGROUND

In general, an integrated circuit or a chip may be included in or on a chip card substrate usually made of plastic material, thereby forming a so-called smart card (in the following also referred to as chip card or as integrated circuit card). There may be various applications including for example personal identification or banking applications. A chip card typically includes a contact pad structure for electrically connecting the chip card to an external device, e.g. to a card reader. Among the different types of smart cards, there are contactless smart cards such that the card data exchange and the power supply of the card may be realized using induction technology, e.g. radio frequency. A so-called dual interface card may include both, the contact pad structure and the contactless interface. The chip card or the chip card substrate, respectively, usually includes a plurality of layers. Technical requirements for the chip card or the chip card substrate typically include that adhesive forces joining the plurality of layers should be high enough to prevent peeling of the layers, even if the chip card is subjected to external forces, chemical substances, temperature variations, etc.

SUMMARY

A chip card substrate is provided that includes a first polymer layer including a first polymer material. The chip card substrate further includes an intermediate layer disposed over the first polymer layer and including polyolefin including a plurality of micro pores, an adhesive layer disposed over the intermediate layer and including an adhesive, and a second polymer layer disposed over the adhesive layer and including a second polymer material different from the first polymer material.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows a process flow for a method of forming a chip card substrate;

DESCRIPTION

Figure 1A:
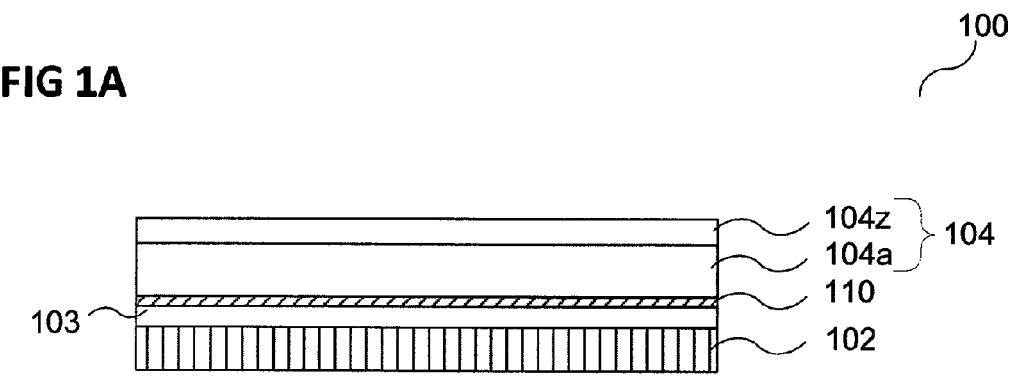
FIG. 1A shows a cross sectional view.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Dimensions of layers described herein may be specified by their dimensions in three orthogonal directions, with the dimension in which the layer is substantially smaller than in the other two dimensions being referred to as the thickness or the height of the layer. The other two dimensions extend in the plane of the layer and orthogonal to each other and to the thickness. One of the other two dimensions extending parallel to a longer edge of the layer may be referred to as the length of the layer. The other dimension, which may extend parallel to a shorter edge of the layer, may be referred to as the width of the layer.

The terms surface, main surface, side or main side of a layer, a chip card substrate or a chip card, unless specified differently, may refer to sides or surfaces of the layer, the chip card substrate or the chip card extending along the length and the width direction. In other words, those terms refer to the sides, in other words surfaces, of the layer, in other words substrate, e.g. a card, that cover substantially more area than edges connecting the two sides, in other words surfaces.

In various embodiments, a bonding between a PET layer and a PCB layer, or between a PET layer and a PVC layer, may be provided by means of an adhesive adhering to the PET and to an intermediate layer, and by the intermediate layer adhering to the PCP or the PVC, respectively. The (indirect) bonding may illustratively be improved compared with a direct bonding between two polymer layers, e.g. a PET layer and a PCB layer, by a layer having micro pores, which illustratively provide a space in which on the one side of the layer, material of a first polymer layer (e.g. PCB layer) may be (received and thus) anchored, and on the opposite side of the layer, material of a second polymer layer (e.g. PET layer) and an adhesive may be (received and thus) anchored.

In various embodiments, the adhesive may be selectively chemically adhesive to the second polymer layer (e.g. PET layer), and not to the first polymer layer (e.g. PCB layer). The intermediate layer, i.e. the layer having micro pores, may provide an interface layer that may compensate, e.g. by means of mechanical adhesion, e.g. by providing an anchor for the first polymer layer and for the adhesive, for a selective lack of chemical adhesion between the adhesive and the first polymer layer (e.g. PCB layer).

Figure 1B:
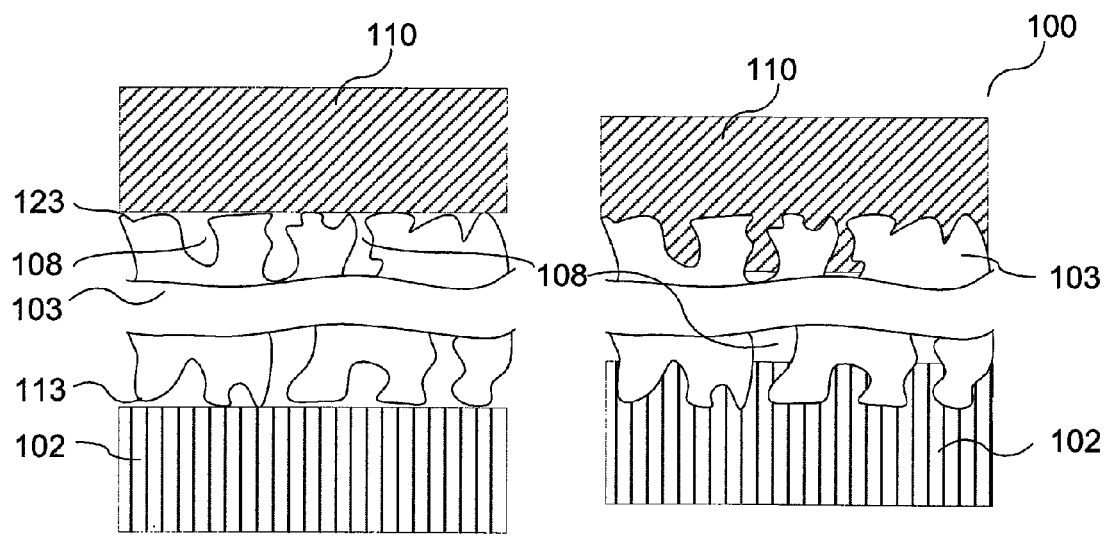
FIG. 1B shows an enlarged cross-sectional view of a chip card substrate according to various embodiments.

FIG. 1A and FIG. 1B show cross sectional views of a chip card substrate 100 according to various embodiments. Only a part of the chip card substrate 100 may be shown, and/or the chip card substrate 100 may be shown after a process of its formation. In other words, a fully functional chip card substrate may include other features, for example further layers, not shown here, and/or the chip card substrate 100 may have more features, for example further layers, added in order to form the fully functional chip card substrate.

As shown in FIG. 1A, the chip card substrate 100 may, in various embodiments, include a first polymer layer 102, also referred to as the bottom polymer layer 102 or the bottom layer 102.

In various embodiments, the chip card substrate 100 may further include an intermediate layer 103 disposed over the first polymer layer 102.

In various embodiments, the chip card substrate 100 may further include an adhesive layer 110 disposed over the intermediate layer 103.

In various embodiments, the chip card substrate 100 may further include a second polymer layer 104, also referred to as the antenna carrier 104 or the middle layer 104. In various embodiments, the second polymer layer 104 may be disposed over the adhesive layer 110.

The first polymer layer 102 may have a rectangular or quadratic shape. The first polymer layer 102 may have a substantially rectangular or quadratic shape. According to various embodiments, the first polymer layer 102 may be a quadratic layer or a rectangular layer having rounded corners.

In various embodiments, the first polymer layer 102 may have a length in a range from about 1 cm to about 20 cm, e.g. from about 1 cm to about 3 cm or from about 5 cm to about 10 cm, e.g. about 8.56 cm or about 6.6 cm or about 2.5 cm or about 1.5 cm.

In various embodiments, the first polymer layer 102 may have a width in a range from about 1 cm to about 10 cm, e.g. from about 1 cm to about 2 cm or from about 3 cm to about 6 cm, e.g. about 5.398 cm or about 3.3 cm or about 1.5 cm or about 1.2 cm or about 4 cm.

According to various embodiments, the first polymer layer 102 may include or may essentially consist of at least one material of the following group of materials: a plastic material, a thermoplastic material, a flexible material, a polymer material, a polyimide, a laminate material, or any other suitable material providing for example a flexible first polymer layer 102. The first polymer layer 102 may include or essentially consist of a substantially amorphous thermoplastic, for example polyvinyl chloride or poly carbonate.

According to various embodiments, the first polymer layer 102 may have a thickness in a range from about 10 µm to about 1 mm, e.g. in the range from about 10 µm to about 200 µm, e.g. in the range from about 10 µm to about 100 µm, e.g. in the range from about 50 µm, e.g. a thickness larger than 50 µm or smaller than 50 µm. The first polymer layer 102 may be a foil 102, e.g. a polymer foil 102.

The second polymer layer 104 may have a rectangular or quadratic shape. The second polymer layer 104 may have a substantially rectangular or quadratic shape. According to various embodiments, the second polymer layer 104 may be a quadratic layer or a rectangular layer having rounded corners.

In various embodiments, the second polymer layer 104 may have a length in a range from about 1 cm to about 20 cm, e.g. from about 1 cm to about 3 cm or from about 5 cm to about 10 cm, e.g. about 8.56 cm or about 6.6 cm or about 2.5 cm or about 1.5 cm.

In various embodiments, the second polymer layer 104 may have a width in a range from about 1 cm to about 10 cm, e.g. from about 1 cm to about 2 cm or from about 3 cm to about 6 cm, e.g. about 5.398 cm or about 3.3 cm or about 1.5 cm or about 1.2 cm or about 4 cm.

In various embodiments, the second polymer layer 104 may include or may essentially consist of a material that is different from the material of the first polymer layer 102 and different from the material of the third polymer layer 106.

The material of the second polymer layer 104 may include or may essentially consist of at least one material of the following group of materials: a plastic material, a thermoplastic material, a flexible material, a polymer material, a polyimide, a laminate material, or any other material that is configured to have disposed, for example by means of etching or printing, an antenna on. In various embodiments, the second polymer layer 104 may include or essentially consist of polyethylene terephthalate (PET).

According to various embodiments, the second polymer layer 104 may have a thickness in a range from about 10 µm to about 1 mm, e.g. in the range from about 10 µm to about 200 µm, e.g. in the range from about 10 µm to about 100 µm. e.g. about 36 µm. The second polymer layer 104 may be a foil 104, e.g. a polymer foil 104.

Figure 2:
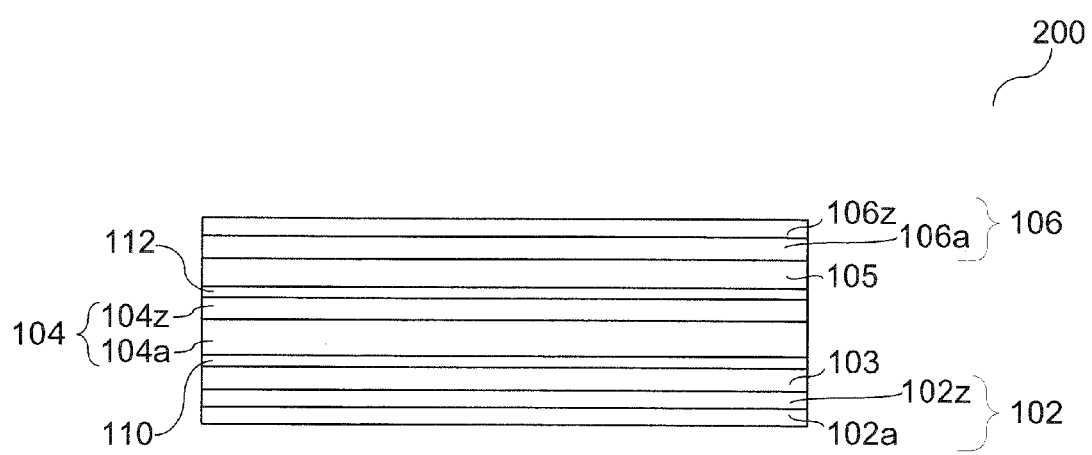
FIG. 2 shows a cross sectional view of a chip card substrate according to various embodiments.

In various embodiments, the first polymer layer 102 may include or essentially consist of a single layer. In various embodiments, as shown in FIG. 2, the first polymer layer 102 may include or essentially consist of a plurality of layers 102a, 102b, 102c, . . . , 102z, for example a layer stack 102a-z including or essentially consisting of the plurality of layers 102a, 102b, 102c, . . . , 102z. "a" and "z" may denote a first layer and a last layer of the layer stack 102a-z. In other words, 102a may be at one end of the layer stack 102a-z, and 102z may be at an opposite end of the layer stack 102a-z.

Each layer of the plurality of layers 102a, 102b, 102c, . . . , 102z may have a thickness that is a fraction up to unity of the thickness of the first polymer layer 102. A sum of the thicknesses of the plurality of layers 102a, 102b, 102c, . . . , 102z may be the thickness of the first polymer layer 102. In various embodiments, at least one layer of the plurality of layers 102a, 102b, 102c, . . . , 102z may have the length and the width of the chip card substrate and/or the chip card. In various embodiments, one or more layers of the plurality of layers 102a, 102b, 102c, . . . , 102z may be shorter than the length of the chip card substrate and/or the chip card. In various embodiments, one or more layers of the plurality of layers 102a, 102b, 102c . . . , 102z may be less wide than the width of the chip card substrate and/or the chip card. In other words, in various embodiments, at least one layer 102a, 102b, 102c, . . . , 102z may have a length and/or a width that is different from the length and/or the width, respectively. In various embodiments, all layers 102a, 102b, 102c . . . , 102z may have the same length and/or the same width.

The first polymer layer 102 may include more than one type of material. In various embodiments, the layer stack 102a-z may include a layer 102a, . . . , 102z of a first material and another layer 102a, . . . , 102z of a second material. In various embodiments, the first polymer layer 102 may for example include a (pure) metal layer 102a, . . . , 102z or a metal alloy layer 102a, . . . , 102z and a polymer layer 102a, . . . , 102z. By way of example, one of the layers 102a, . . . , 102z may, partially or completely, include or essentially consist of the metal or the metal alloy. The layer 102a, . . . , 102z may for example include a metal shielding structure for protecting parts and/or regions of the chip card from electromagnetic radiation. In various embodiments, the first polymer layer 102 may include a paper layer. In various embodiments, the first polymer layer 102 may include a capacitor structure. In various embodiments, different layers 102a, . . . , 102z may include different structures, e.g. layers 102a, 102c and 102e may include or essentially consist of polycarbonate layers, layer 102b may include a shielding structure, and layer 102d may include a capacitor structure.

In various embodiments, the first polymer layer 102 may for example include at least one contact pad (not shown), e.g. two contact pads, e.g. three contact pads, e.g. four contact pads, e.g. five contact pads, e.g. six contact pads, e.g. seven contact pads, e.g. eight contact pads, e.g. nine contact pads, e.g. ten contact pads, or even more than ten contact pads. The contact pads may be exposed on one or both main surfaces of the first polymer layer 102. The contact pads may be arranged in accordance with the standard ISO 7816.

In various embodiments, as shown in FIG. 2, the second polymer layer 104 may include or consist of a single layer. In various embodiments, the second polymer layer 104 may include or consist of a plurality of layers 104a, 104b, 104c, ..., 104z, for example a layer stack 104a-z including or consisting of the plurality of layers 104a, 104b, 104c, ..., 104z.

Each layer of the plurality of layers 104a, 104b, 104c, ..., 104z may have a thickness that is a fraction up to unity of the thickness of the second polymer layer 104, wherein the sum of the thicknesses of the layers 104a, 104b, 104c, ..., 104z may be the thickness of the second polymer layer 104. In various embodiments, at least one layer of the plurality of layers 104a, 104b, 104c, ..., 104z may have a maximum length and a maximum width, wherein the maximum length may be the final length of the chip card substrate and/or the chip card, and wherein the maximum width may be the final width of the chip card substrate and/or the chip card. In various embodiments, all layers 104a, 104b, 104c, ..., 104z may have the same length and/or the same width. In various embodiments, at least one layer 104a, 104b, 104c, ..., 104z may have a length and/or a width that is different from the maximum length and/or the maximum width, respectively.

The second polymer layer 104 may include more than one type of material. In various embodiments, the layer stack 104a-z may for example include a layer 104a, 104b, 104c, ... 104z of one material and another layer 104a, 104b, 104c, ..., 104z of a different material. In various embodiments, at least the material of one of the layers 104a, ..., 104z may be different from all materials of the first polymer layer 102 and from all materials of the third polymer layer 106. The layer stack 104a-z may include a metal layer 104a, 104b, 104c, ..., 104z or a metal alloy layer 104a, 104b, 104c, ..., 104z and a polymer layer 104a, 104b, 104c, ..., 104z. By way of example, one of the layers 104a, 104b, 104c, ..., 104z may include a metal or a metal alloy. The layer 104a, 104b, 104c, ..., 104z may for example include an antenna. The second polymer layer 104 may for example include at least one contact pad, e.g. two contact pads, e.g. three contact pads, e.g. four contact pads, e.g. five contact pads, e.g. six contact pads, e.g. seven contact pads, e.g. eight contact pads, e.g. nine contact pads, e.g. ten contact pads, or even more than ten contact pads. The contact pads may be electrically conductively connected to the antenna. In various embodiments, at least one of the layers 104a, ..., 104z may for example include a metal shielding structure for protecting parts/regions of the chip card from electromagnetic radiation. In various embodiments, the second polymer layer 104 may include a paper layer. In various embodiments, the second polymer layer 104 may include a capacitor structure. In various embodiments, different layers 104a, ..., 104z may include different structures, e.g. layers 104a and 104c may include or consist of one antenna 330 each, and layer 104b may include or consist of PET.

In various embodiments, the adhesive layer 110 may include or essentially consist of an adhesive material, also referred to as adhesive. In various embodiments, the first layer 104a of the layer stack 104a-z of the second polymer layer 104 may be in contact, e.g. in physical contact, with the adhesive layer 110. In various embodiments, the last layer 104z of the layer stack 104a-z of the second polymer layer 104 may be in contact, e.g. in physical contact, with the adhesive layer 110. In various embodiments, one or more other layers, e.g. layer 104b, layer 104y, etc. of the layer stack 104a-z of the second polymer layer 104 may be in contact, e.g. in physical contact, with the adhesive layer 110. In various embodiments, the adhesive layer 110 may be in, e.g. physical, contact with the intermediate layer 103.

In various embodiments, the adhesive of the adhesive layer 110 may be configured to adhere to at least one material of the second polymer layer 104. The adhesive layer 110 may be in, e.g. physical, contact with the material of the second polymer layer 104 that the adhesive is configured to adhere to. The adhesive may be configured to adhere to the polymer material of the second polymer layer 104. The adhesive may be suitable configured to adhere to a PET layer of the second polymer layer 104. The PET layer may for example be layer 104a in FIG. 1A and FIG. 1B. The adhesive layer 110 may be in, e.g. physical, contact with the PET layer 104a.

In various embodiments, the adhesive may further be configured to adhere to a thermoplastic organic polymer, for example to a water-insoluble thermoplastic organic polymer. The adhesive may for example be configured to adhere to polyolefin, for example to micro porous polyolefin. In various embodiments, the adhesive may be configured to adhere to polyethylene. The adhesive may be configured to adhere to micro porous polyethylene. The adhesive may be configured to adhere to the material of the intermediate layer 103. The adhesive may be configured to adhere to the intermediate layer 103.

The adhesive material may be configured to undergo a thermal process to be applied to the chip card substrate 100, for example a lamination process, and for nevertheless preserving or regaining its physical and chemical properties, for example its adhesive strength, etc. In other words, the adhesive may be configured to be heated, for example up to its softening temperature or up to its melting temperature, for example to a temperature of up to 200° C., and for nevertheless keeping its adhesive properties, tensile strength etc. or for re-gaining them after cooling down.

In various embodiments, the adhesive layer 110 may have a thickness in a range from about 1 µm to about 200 µm, for example from about 10 µm to about 100 µm, for example around 50 µm.

In various embodiments, the adhesive layer 110 may have a length in a range from about 1 cm to about 20 cm, e.g. from about 1 cm to about 3 cm or from about 5 cm to about 10 cm, e.g. about 8.56 cm or about 6.6 cm or about 2.5 cm or about 1.5 cm.

In various embodiments, the adhesive layer 110 may have a width in a range from about 1 cm to about 10 cm, e.g. from about 1 cm to about 2 cm or from about 3 cm to about 6 cm, e.g. about 5.398 cm or about 3.3 cm or about 1.5 cm or about 1.2 cm or about 4 cm.

In various embodiments, the length and/or the width of the adhesive layer may be the same or approximately the same as the length and/or the width of the second polymer layer 104, for example of the polymer layer 104a of the second polymer layer 104, respectively.

In various embodiments, the adhesive may include or essentially consist of a glue. In various embodiments, the adhesive may include or essentially consist of polyvinyl alcohol (PVA).

In various embodiments, the adhesive may be disposed over the second polymer layer 104 diluted in a solvent, and the solvent may be removed. In this way, the adhesive layer 110 may be formed over the second polymer layer 104. For example, the adhesive may be sprayed, rolled or printed onto the second polymer layer 104. In various embodiments, the adhesive may be disposed over the intermediate layer 103, for example in a similar manner as described for disposing the adhesive over the second polymer layer 104. In this way, the adhesive layer 110 may be formed over the intermediate layer 103. In various embodiments, the adhesive layer 110 may be a foil that is arranged over the intermediate layer 103. The foil may be arranged between the intermediate layer 103 and the second polymer layer 104.

In various embodiments, the intermediate layer 103 may be disposed between the first polymer layer 102 and the second polymer layer 104. In various embodiments, the adhesive layer 110 may be disposed between the intermediate layer 103 and the second polymer layer 104.

In various embodiments, the intermediate layer 103 may include or essentially consist of a thermoplastic organic polymer, for example of a water-insoluble thermoplastic organic polymer. The intermediate layer 103 may for example include or essentially consist of polyolefin. In various embodiments, the intermediate layer 103 may include or essentially consist of polyethylene. The intermediate layer 103 may for example include between about 30% and 50% by weight of polyolefin, for example of polyethylene.

In various embodiments, a significant portion of a volume of the intermediate layer 103 may include a plurality of microscopic pores 108, also referred to as micro pores 108 or as pores 108. For example, the volume of the intermediate layer 103 taken up by the microscopic pores 108 may be in a range from about 50% to about 80%, for example about 65%. The pores 108 may be connected with each other. In various embodiments, each micro pore 108 may be essentially spherical. In various embodiments, each micro pore 108 may have an arbitrary shape. In various embodiments, the intermediate layer 103 may have two main surfaces 113, 123. In various embodiments, at least a fraction of the pores 108 may be connected with the main surface 113, and at least a fraction of the pores 108 may be connected with the other main surface 123. The material of the intermediate layer 103 and/or the structure of the intermediate layer 103 may also be referred to as micro porous.

In various embodiments, the microscopic pores 108 may have an average size in a range from about 0.6 μm to about 50 μm, for example from about 1 μm to about 40 μm, for example from about 2 μm to about 30 μm.

In various embodiments, the intermediate layer 103 may include or essentially consist of synthetic paper.

In various embodiments, the intermediate layer 103 may include or essentially consist of micro porous polyethylene. In various embodiments, the intermediate layer 103 may further include silicon dioxide, $SiO_2$. The intermediate layer 103 may for example include between about 50% and 70% by weight of silicon dioxide. The intermediate layer 103 may for example essentially consist of a combination of about 40% polyethylene and about 60% silicon dioxide (by weight, respectively). The micro porous structure may be formed such that about 50% to 80% of the volume are filled with a gaseous medium, for example with air. About 50% to 80% of the volume may be filled with a surrounding medium, for example with air. For example, about 65% of the volume of the intermediate layer 103 may be filled with the gaseous medium, for example with air. For example, about 65% of the volume of the intermediate layer 103 may be filled with the surrounding medium, for example by air.

In various embodiments, the intermediate layer 103 may include or essentially consist of Teslin®.

In various embodiments, a thickness of the intermediate layer 103 may be in a range from about 50 μm to about 300 μm, for example in a range from about 100 μm to about 200 μm, for example around 180 μm.

In various embodiments, adhesion, i.e. an adhesion bonding, between the intermediate layer 103 and the polymer layer 104b of the second polymer layer 104 by means of the adhesive layer 110 may be formed. The bonding may be formed by means of laminating, for example by a combination of heat and pressure.

In various embodiments, a softening temperature of the material of the first polymer layer 102 may be lower than a softening temperature of the polymer layer 104b of the second polymer layer 104. In various embodiments, the softening temperature of the material of the first polymer layer 102 may be lower than a softening temperature of the intermediate layer 103.

In various embodiments, a melting temperature of the material of the first polymer layer 102 may be lower than a melting temperature of the polymer layer 104a of the second polymer layer 104. In various embodiments, the melting temperature of the material of the first polymer layer 102 may be lower than a melting temperature of the intermediate layer 103.

In various embodiments, a softening temperature of the material of the adhesive layer 110 may be lower than a softening temperature of the polymer layer 104a of the second polymer layer 104. In various embodiments, the softening temperature of the material of the adhesive layer 110 may be lower than a softening temperature of the intermediate layer 103.

In various embodiments, a melting temperature of the material of the adhesive layer 110 may be lower than a melting temperature of the polymer layer 104a of the second polymer layer 104. In various embodiments, the melting temperature of the material of the adhesive layer 110 may be lower than a melting temperature of the intermediate layer 103.

In various embodiments, the softening temperature of the material of the first polymer layer 102 and the softening temperature of the material of the adhesive layer 110 may be comparable, for example the softening temperature of the material of the first polymer layer 102 and the softening temperature of the material of the adhesive layer 110 may differ by no more than 30% of the higher temperature of the two, for example by no more than 20%, for example by no more than 10%.

In various embodiments, the melting temperature of the material of the first polymer layer 102 and the melting temperature of the material of the adhesive layer 110 may be comparable, for example the melting temperature of the material of the first polymer layer 102 and the melting temperature of the material of the adhesive layer 110 may differ by no more than 30% of the higher temperature of the two measured in ° C., for example by no more than 20%, for example by no more than 10%. In various embodiments, the melting temperatures and/or the softening temperatures of the material of the adhesive layer 110 may differ by more than 30%.

In various embodiments, as shown in FIG. 1B, which shows an enlarged view of regions of the intermediate layer 103, the intermediate layer 103 may be arranged between the first polymer layer 102 and the adhesive layer 110. The intermediate layer 103 may include micro pores 108, such that it forms the microporous structure. When the intermediate layer 103 is first disposed above the first polymer layer 102, and the adhesive layer 110 is disposed above the intermediate layer 103, the layers may lie one above the other in a layer stack without being bonded (FIG. 1B, left).

FIG. 1B (right) shows the layer stack from FIG. 1B (left) after the bonding, for example after a laminating. The layer stack may for example have been heated and/or pressed.

In various embodiments, during a bonding of the first polymer layer 102 and the second polymer layer 104 by means of the intermediate layer 103 and the adhesive layer 110, the temperature for the bonding, for example for the laminating, may be chosen such that the adhesive layer 110 and the first polymer layer 102 may reach temperatures beyond their respective softening points or beyond their respective melting points, but the polymer layer 104a of the second polymer layer 104 and the intermediate layer 103 reach maximum temperatures below their respective softening temperatures. Thereby, and in various embodiments additionally by means of pressure applied to the layer stack, the softened first polymer layer 102 may partially intrude into the micro pores 108 that are formed in the intermediate layer 103 and connected with the surface 113 of the intermediate layer 103, wherein the surface 113 of the intermediate layer 103 may be facing towards the first polymer layer 102, and the softened adhesive layer 110 may partially intrude into the micro pores 108 that are formed in the intermediate layer 103 and connected with the other surface 123 of the intermediate layer 103, wherein the surface 123 of the intermediate layer 103 may be facing towards the second polymer layer 104 and towards the adhesive layer 110. In various embodiments, after a lowering of the temperature, the material of the adhesive layer 110 and the material of the first polymer layer 102 may harden again and form an adhesive bonding between the first polymer layer 102 and the intermediate layer 103, and between the intermediate layer 103 and the second polymer layer 104, respectively. The adhesive bonding between the first polymer layer 102 and the intermediate layer 103 may include mechanical adhesion between the material of the first polymer layer 102 and the material of the intermediate layer 103 by means of the softened material of the first polymer layer 102 having intruded into the micro pores 108 and having hardened there. The adhesive bonding between the first polymer layer 102 and the intermediate layer 103 may also include chemical adhesion between the material of the first polymer layer 102 and the material of the intermediate layer 103.

The adhesive bonding between the second polymer layer 104 and the intermediate layer 103 may include mechanical adhesion between the material of the adhesive layer 110 and the material of the intermediate layer 103 by means of the softened material of the adhesive layer 110 having intruded into the micro pores 108 and having hardened there. The adhesive bonding between the second polymer layer 104 and the intermediate layer 103 may also include chemical adhesion between the material of the adhesive layer 110 and the material of the intermediate layer 103. The adhesive bonding between the second polymer layer 104 and the intermediate layer 103 may also include chemical adhesion between the material of the second polymer layer 104 and the adhesive layer 110.

In various embodiments, the layer stack may include the first polymer layer 102, the intermediate layer 103, the adhesive layer 110, and the second polymer layer 104. In various embodiments, the layer stack may be bonded to form a bonded layer stack. In various embodiments, all layers may be heated up to approximately the same temperature, and the respective materials of the layers may be chosen such that the first polymer layer 102 and the adhesive layer 110 soften at the chosen temperature, while the intermediate layer 103 and the polymer layer 104b of the second polymer layer 104 do not reach their respective softening points.

In various embodiments, the layer stack may include the first polymer layer 102, the intermediate layer 103, the adhesive layer 110, and the second polymer layer 104. In various embodiments, the layer stack may be bonded to form a bonded layer stack. In various embodiments, a temperature gradient may be formed in the layer stack. In various embodiments, one material of the materials of the adhesive layer 110 and of the first polymer layer 102 may have a higher softening temperature and/or a higher melting temperature, in other words a higher heat tolerance, than the other material of the materials of the adhesive layer 110 and of the first polymer layer 102. In various embodiments, the heat gradient may be formed such that the material with the higher heat tolerance is heated up to a higher temperature than the other material of the two materials of the adhesive layer 110 and of the first polymer layer 102. For example, heat may be applied from a direction of the second polymer layer 104, if the softening and/or the melting temperature of the material of the adhesive layer 110 is higher than the softening and/or the melting temperature of the material of the first polymer layer 102.

In various embodiments, the bonding of the chip card substrate 100 may not be performed during a single bonding, but may be performed in two or more stages of bonding. By way of example, for a first bonding, the layer stack may include the intermediate layer 103, and the second polymer layer 104, including the adhesive layer 110, if the softening and/or melting temperature of the material of the adhesive layer 110 is higher than the softening and/or melting temperature of the material of the first polymer layer 102. The layer stack including the intermediate layer 103, the adhesive layer 110 and the second polymer layer 104, may be heated and/or pressed such that the intermediate layer 103 and the second polymer layer 104 bond by means of the adhesive layer 110, forming a pre-bonded stack. Then, the pre-bonded stack may be disposed over the first polymer layer 102, thereby forming another layer stack. The other layer stack may then be bonded by heating up the stack, or at least the first polymer layer 102, to the softening and/or melting temperature of the first polymer layer 102, and optionally by pressing the stack. By way of another example, for a first bonding, the layer stack may include the intermediate layer 103, and the first polymer layer 102, if the softening and/or melting temperature of the material of the adhesive layer 110 is lower than the softening and/or melting temperature of the material of the first polymer layer 102, and the forming of the pre-bonded stack and of the bonded stack may be performed mutatis mutandis as outlined above.

FIG. 2 shows a cross sectional view of a chip card substrate 200 according to various embodiments.

The chip card substrate 200 may be included in a chip card.

As shown in FIG. 2, the chip card substrate 200 may, in various embodiments, include a first polymer layer 102, a second polymer layer 104, a third polymer layer 106, an intermediate layer 103, an adhesive layer 110, another adhesive layer 112, and another intermediate layer 105. Layers, materials, properties, positions etc. shown and described in context with FIG. 1A and/or FIG. 1B for the chip card substrate 100 may be the same or similar for the respective layers shown and described here for the chip card substrate 200.

The chip card substrate 200 may be considered as showing all the layers of the chip card substrate 100, and/or the chip card substrate may represent the chip card substrate after a further processing of the chip card substrate 100. The first chip card substrate 100 and the second chip card substrate 200 may differ in that the second chip card substrate 200 includes the another adhesive layer 112, the another intermediate layer 105, and the third polymer layer 106.

In various embodiments, the second polymer layer 104 may be disposed over the first polymer layer 102, the third polymer layer 106 may be disposed over the second polymer layer 104, the intermediate layer 103 may be arranged between the first polymer layer 102 and the second polymer layer 104. The another intermediate layer 105 may be arranged between the second polymer layer 104 and the third polymer layer 106. The adhesive layer 110 may be disposed between the intermediate layer 103 and the second polymer layer 104, and the another adhesive layer 112 may be arranged between the another intermediate layer 105 and the second polymer layer 104.

In other words, the intermediate layer 103 may be arranged over the first polymer layer 102, the adhesive layer 110 may be arranged over the intermediate layer 103, the second polymer layer 104 may be arranged over the adhesive layer 110, the another adhesive layer 112 may be arranged over the second polymer layer 104, the another intermediate layer 105 may be arranged over the another adhesive layer 112, and the third polymer layer 106 may be arranged over the another intermediate layer 105.

In various embodiments, properties of the another adhesive layer 112 may essentially be the same or similar to those of the adhesive layer 110, for example the material of the another adhesive layer 112 may have essentially the same properties, for example adhesive properties, as that of the adhesive layer 110. The material of the another adhesive layer 112 may essentially be the same as the material of the adhesive layer 110. The other adhesive layer 112 may, mutatis mutandis, be arranged between the second polymer layer 104 and the another intermediate layer 105 in any of the manners described in context with the arrangement of the adhesive layer 110 between the intermediate layer 103 and the second polymer layer 104. The another adhesive layer 112 may be in, e.g. physical, contact with the second polymer layer 104, for example with the last layer 104z of the second polymer layer 104, or with the first layer 104a of the second polymer layer 104, and/or with other layers, e.g. layers 104y or 104b, of the second polymer layer. The adhesive layer 112 may be in, e.g. physical, contact with the another intermediate layer 105.

In various embodiments, a bonding between the second polymer layer 104 and the third polymer layer 106 by means of the another intermediate layer 105 and the another adhesive layer 112 may be obtained in the same way as the bonding between the first polymer layer 102 and the second polymer layer 104 by means of the intermediate layer 103 and the adhesive layer 110, as described above.

In various embodiments, the bonding of the layer stack may for example include heating the whole layer stack to one common temperature. The one common temperature may be above the softening temperature or above the melting temperature of the material(s) of the adhesive layers 110 and 112, and above the softening temperature or above the melting temperature of the material(s) of the first polymer layer 102 and of the third polymer layer 106. The one common temperature may be below a softening temperature of the materials of the second polymer layer, i.e. below the softening point of the layers 104a, . . . 104z, and below the softening temperatures of the material(s) of the intermediate layer 103 and of the another intermediate layer 105.

In various embodiments, a temperature gradient may be formed in the layer stack, for example a temperature reached at or near the middle polymer layer 104 may be lower than a temperature reached by the bottom polymer layers 102 and/or lower than a temperature reached by the top polymer layer 106, respectively. The temperature gradient may be formed and the materials for the layers may be chosen such that the temperature at the bottom 102 and top 106 layers and at the adhesive layers 110 and 112 reaches or exceeds the softening temperature or the melting temperature, respectively, but that the temperature at the intermediate layers 103, 105 and at the middle polymer layer 104 does not reach or exceed the softening temperature.

In various embodiments, the layer stacks may be set under pressure when at least one of the adhesive layers 110 and 112, the first polymer layer 102, and the third polymer layer 106 is soft or molten.

In various embodiments, the bonding or laminating of the layer stack may be performed in two or more processes, for example during a first bonding, the intermediate layers 103, 105 may be bonded with the middle polymer layer 104 by means of the adhesive layers 110, 112, respectively, for example by means of heating and/or by means of pressing, thereby forming a pre-bonded stack, and during a second bonding, the pre-bonded stack may be bonded to the first and the third polymer layer 102, 106 by means of heating and/or by means of pressing.

In various embodiments, the chip card substrate 200 may be obtained by forming a bonded layer stack as shown in FIG. 2. The bonded layer stack may for example include the bottom polymer layer 102 and the top polymer layer 106, and in between them the middle polymer layer 104. The polymer layers may be bonded by means of the adhesive layers 110 and 112, and by means of the intermediate layers 103 and 105, respectively. In other words, the bonding between the polymer layer 102 and the middle polymer layer 104 may be achieved by bonding the bottom polymer layer 102 to the intermediate layer 103, by bonding the intermediate layer 103 to the middle polymer layer 104 by means of the adhesive layer 110, by bonding the middle polymer layer to the another intermediate layer 105 by means of the another adhesive layer 112, and by bonding the another intermediate layer 105 to the top polymer layer 106. The bonding may for example be performed by means of laminating as described above. In other words, the bonding may for example be achieved by means of a lamination process as described above.

In various embodiments, properties of the another intermediate layer 105 may be the same or similar to those of the intermediate layer 103, for example the material, the thickness, the structure etc. of the another intermediate layer 105 may be the same as that of the intermediate layer 103.

The third polymer layer 106 may have a rectangular or quadratic shape. The third polymer layer 106 may have a substantially rectangular or quadratic shape. The third polymer layer 106 may have a rectangular or quadratic shape. According to various embodiments, the third polymer layer 106 may be a quadratic layer or a rectangular layer having rounded corners.

In various embodiments, the third polymer layer 106 may have a length in a range from about 1 cm to about 20 cm, e.g.

from about 1 cm to about 3 cm or from about 5 cm to about 10 cm, e.g. about 8.56 cm or about 6.6 cm or about 2.5 cm or about 1.5 cm.

In various embodiments, the third polymer layer 106 may have a width in a range from about 1 cm to about 10 cm, e.g. from about 1 cm to about 2 cm or from about 3 cm to about 6 cm, e.g. about 5.398 cm or about 3.3 cm or about 1.5 cm or about 1.2 cm or about 4 cm.

In various embodiments, at least the first polymer layer 102 and the third polymer layer 106 may have a length of 8.56 cm and a width of 5.398 cm, or at least the first polymer layer 102 and the third polymer layer 106 may have a length of 6.6 cm and a width of 3.3 cm, or at least the first polymer layer 102 and the third polymer layer 106 may have a length of 2.5 cm and a width of 1.5 cm, or at least the first polymer layer 102 and the third polymer layer 106 may have a length of 1.5 cm and a width of 1.2 cm, or at least the first polymer layer 102 and the third polymer layer 106 may have a length of 6.56 cm and a width 4 cm.

In various embodiments, the chip card substrate 200, wherein the chip card substrate 200 may include the first polymer layer 102, the second polymer layer 104, the third polymer layer 106, the adhesive layer 110, the another adhesive layer 112, the intermediate layers 103 and the another intermediate layer 105, may have a thickness in a range from about 0.3 mm to about 2 mm, for example from about 0.5 mm to 1 mm, for example a thickness of about 0,762 mm.

According to various embodiments, the third polymer layer 106 may include or may essentially consist of the same material as the first polymer layer 102. In various embodiments, the first polymer layer 102 and the third polymer layer 106 may include or essentially consist of different materials. The third polymer layer 106 may include or may essentially consist of at least one material of the following group of materials: a plastic material, a thermoplastic material, a flexible material, a polymer material, a polyimide, a laminate material, or any other suitable material providing for example a flexible third polymer layer 106. In various embodiments, the third polymer layer 106 may include or essentially consist of a substantially amorphous thermoplastic, for example polyvinyl chloride or poly carbonate. If the first polymer layer 102 includes or essentially consists of polyvinyl chloride, the third polymer layer 106 may include or essentially consist of polyvinyl chloride. If the first polymer layer 102 includes or essentially consists of poly carbonate, the third polymer layer 106 may include or essentially consist of poly carbonate.

According to various embodiments, the third polymer layer 106 may have a thickness in a range from about 10 μm to about 1 mm, e.g. in the range from about 10 μm to about 200 μm, e.g. in the range from about 10 μm to about 100 μm, e.g. in the range from about 50 μm, e.g. a thickness larger than 50 μm or smaller than 50 μm. The third polymer layer 106 may be a foil 106, e.g. a polymer foil 106.

In various embodiments the third polymer layer 106, as shown in FIG. 2, may include or consist of a single layer. In various embodiments, the third polymer layer 106 may include or consist of a plurality of layers 106a, 106b, 106c, . . . , 106z, for example a layer stack 106a-z including or consisting of the plurality of layers 106a, 106b, 106c, . . . , 106z. "a" and "z" may denote a first layer and a last layer of the layer stack 106a-z. In other words, 106a may be at one end of the layer stack 106a-z, and 106z may be at the other end of the layer stack 106a-z.

Each layer of the plurality of layers 106a, 106b, 106c, . . . , 106z may have a thickness that is a fraction up to unity of the thickness of the third layer 106. A sum of the thicknesses of the plurality of layers 106a, 106b, 106c, . . . , 106z may be the thickness of the third layer 106. In various embodiments, at least one layer of the plurality of layers 106a, 106b, 106c, . . . , 106z may have the length of the chip card substrate and/or the chip card and the width of the chip card substrate and/or the chip card. In various embodiments, at least one layer 106a, 106b, 106c, . . . , 106z may have a length and/or a width that is different from the length and/or the width of the chip card substrate and/or the chip card, respectively.

In various embodiments, all layers 106a, 106b, 106c, . . . , 106z may have the same length and/or the same width.

The third polymer layer 106 may include more than one type of material. In various embodiments, the layer stack 106a-z may include a layer 106a, . . . , 106z of a first material and another layer 106a, . . . , 106z of a second material. In various embodiments, the third polymer layer 106 may for example include a metal layer 106a, . . . , 106z or a metal alloy layer 106a, . . . , 106z and a polymer 106a, . . . , 106z. By way of example, one of the layers 106a, . . . , 106z may, partially or completely, include or essentially consist of the metal or the metal alloy. The layer 106a, . . . , 106z may for example include a metal shielding structure for protecting parts and/or regions of the chip card from electromagnetic radiation. In various embodiments, the third polymer layer 106 may include a paper layer. In various embodiments, the third polymer layer 106 may include a capacitor structure. In various embodiments, different layers 106a, . . . , 106z may include different structures, e.g. layers 106a, 106c and 106e may include or essentially consist of polycarbonate layers, layer 106b may include a shielding structure, and layer 106d may include a capacitor structure.

In various embodiments, the third polymer layer 106 may for example include at least one contact pad, e.g. two contact pads, e.g. three contact pads, e.g. four contact pads, e.g. five contact pads, e.g. six contact pads, e.g. seven contact pads, e.g. eight contact pads, e.g. nine contact pads, e.g. ten contact pads, or even more than ten contact pads. The contact pads may be exposed on one or both main surfaces of the third polymer layer 106. The contact pads may be arranged in accordance with the standard ISO 7816.

A bonding of the plurality of layers 102a, . . . , 102z of the layer stack 102a-z with each other, irrespective of whether this occurs during the bonding of the layer stack 102a-z to the other layers of the chip card substrate or not, is well known in the art and has no relevance to the invention. The same applies to a bonding of the plurality of layers 104a, . . . , 104z of the layer stack 104a-z with each other, and to a bonding of the plurality of layers 106a, . . . , 106z of the layer stack 106a-z with each other.

In various embodiments, the antenna carrier 104 may include an antenna 330. In various embodiments, the antenna 330 may be formed on or over the antenna carrier 104. In various embodiments, the antenna 330 may be formed within the antenna carrier 104. In other words, the antenna 104, i.e. an antenna structure 104, may be formed as an intermediate layer 104x of the second polymer layer 104, with x being neither "a" nor "z". The shape of the antenna 330 may be rectangular, e.g. square. In other words, an antenna line 330, also referred to as line 330, for example a line 330 of a conducting material, may be arranged on or over or within the antenna carrier 104. The line 330 may be arranged in a shape of a square or a rectangle.

In various embodiments, the shape of the antenna 330 may be circular, ellipsis, triangular, pentagonal or polyangular.

In various embodiments, ends of the line 330 may not join, i.e. the square, rectangle, circle, ellipse, triangle, pentagon or polygon may not be closed.

In various embodiments, the antenna 330 may include or essentially consist of a single conducting antenna line 330. In various embodiments, the line 330 may circle a circumference of the rectangle or the square more than once, for example twice or more. A corresponding multiplicity of parts of the line 330 may also be referred to as antenna tracks. In various embodiments, the multiplicity of conducting lines 330 may be adjacent to each other.

The antenna 330 may have an inside diameter, i.e. a smallest distance between an innermost part $330_i$, i.e. the innermost antenna track $330_i$ of the line 330 arranged near opposite edges of the antenna carrier 104, in a range from about 2 mm to about 5 cm. e.g. from about 3 cm to about 4.5 cm, or e.g. from about 0.8 cm to about 3.5 cm.

According to various embodiments, the antenna 330 may have a width in a range from about 0.2 mm to about 5 mm, e.g. from about 0.5 mm to about 3 mm, e.g. from about 0.75 mm to about 1.5 mm, e.g. about 1 mm.

In various embodiments, the antenna 330 may have a thickness in a range of about 1 μm to about 100 μm, e.g. from about 5 μm to about 50 μm, e.g. from about 10 μm to about 20 μm, e.g. about 15 μm.

In various embodiments, the antenna 330 may be made by using aluminum or copper etch technology, so that the antenna 330 may include aluminum or copper. In various embodiments, the antenna 330 may essentially consist of a conducting material. e.g. a metal, a metal alloy, a metallic material, a metallic compound, including at least one of Cu, Al, Au, Ag, Pt, Ti, Ni, Sn, Zn, Pb, CuNi, or any non-metal electrically conducting material, e.g. graphite. In various embodiments, the antenna 330 may include a patterned layer, e.g. a patterned metal layer, e.g. a patterned copper layer (e.g. provided by using a copper etch technology). In various embodiments, the antenna 330 may be printed, for example using Ag paste.

According to various embodiments, a configuration of the antenna 330 as described before, e.g. in shape, in thickness, applied materials, applied structure may allow the antenna 330 to be flexible, such that the antenna 330 may withstand deformations if the antenna carrier 104 is bent, e.g. due to mechanical load.

According to various embodiments, the antenna 330 may be attached to the antenna carrier 104 by means of etching. The antenna 330 may also be attached to the antenna carrier 104 by means of an adhesive, soldering, molding, printing, etc.

In various embodiments, a contact pad 332 may be formed on or over the antenna carrier 104. The antenna 330 arranged on the antenna carrier 104 may have an electrically conductive connection to the at least one contact pad 332.

In various embodiments, the contact pad may be formed on the same side of the second polymer layer 104 as the antenna 330. In various embodiments, the contact pad 332 may be formed on the side of the second polymer layer 104 that the antenna 330 is not formed on. In various embodiments, the contact pad 332 may be connected to the antenna 330 by means of a via through the second polymer layer 104.

In various embodiments, a plurality of antennas 330 may be formed on or over or within the antenna carrier 104. For example, a chip card main antenna 330 and a booster antenna 330 for contactless transmission of information between a chip 550 (see FIG. 3A and/or FIG. 3B) and the chip card main antenna 330 may be provided.

In various embodiments, the antenna 330 may be attached to at least one of a front side of the antenna carrier 104 and a back side of the antenna carrier 104. The front side may be defined as the side of the antenna carrier 104 that will be facing towards the chip 550, if and when the chip 550 will be mounted. The back side may be defined as the side of the second polymer layer 104 opposite the front side of the second polymer layer 104.

If the plurality of antennas 330 is formed, the antennas 330 may be formed on both sides of the antenna carrier 104, or all the antennas 330 may be formed on the same side of the antenna carrier 104.

In various embodiments, a plurality of chip card substrates 200 may be formed in a common process, for example by forming a stack of sheets. The stack of sheets may include a sheet including a plurality of first polymer layers 102, a sheet including a plurality of second polymer layers 104, a sheet including a plurality of third polymer layers 106, a sheet including a plurality of intermediate layers 103, a sheet including a plurality of intermediate layers 105, and adhesive layers 110 and 112 formed over the sheet of intermediate layers 103, the sheet of intermediate layers 105 and/or over the sheet of second polymer layers 104 in such a way that the adhesive forms sheet-like layers of adhesive between the sheet of intermediate layers 103 and the sheet of second polymer layers 104, and between the sheet of intermediate layers 105 and the sheet of second polymer layers 104.

The sheet of first polymer layers 102 may include, arranged in a plane, a plurality of first polymer layers 102. In various embodiments, the sheet of first polymer layers 102 may include or essentially consist of a two-dimensional array of first polymer layers 102.

The sheet of second polymer layers 104 may include, arranged in a plane, a plurality of second polymer layers 104. In various embodiments, the sheet of second polymer layers 104 may include or essentially consist of a two-dimensional array of second polymer layers 104.

The sheet of third polymer layers 106 may include, arranged in a plane, a plurality of third polymer layers 106. In various embodiments, the sheet of third polymer layers 106 may include or essentially consist of a two-dimensional array of third polymer layers 106.

The sheet of intermediate layers 103 may include, arranged in a plane, a plurality of intermediate layers 103. In various embodiments, the sheet of intermediate layers 103 may include or essentially consist of a two-dimensional array of intermediate layers 103.

The sheet of another intermediate layers 105 may include, arranged in a plane, a plurality of another intermediate layers 105. In various embodiments, the sheet of another intermediate layers 105 may include or essentially consist of a two-dimensional array of another intermediate layers 105.

In various embodiments, the adhesive may be arranged on one side of the intermediate layer 103, for example on the side of the intermediate layer 103 that faces the second polymer layer 104. In various embodiments, the adhesive may be arranged on one side of the second polymer layer 104, for example on the side of the second polymer layer 104 that faces the intermediate layer 103. In various embodiments, the adhesive may be arranged on the intermediate layer 103 or on the second polymer layer 104 for example by means of spraying, printing, depositing, and the like, thereby forming a sheet including a plurality of adhesive layers 110. A sheet, e.g. an individual sheet, including a plurality of adhesive layers 110 may be formed and arranged between the intermediate layer 103 and the second polymer layer 104.

In various embodiments, the adhesive may be arranged on one side of the intermediate layer 105, for example on the side of the intermediate layer 105 that faces the second polymer layer 104. The adhesive may be arranged on one side of the second polymer layer 104, for example on the side of the second polymer layer 104 that faces the intermediate layer 105. The adhesive may be arranged on the intermediate layer 105 or on the second polymer layer 104 for example by means of spraying, printing, depositing, and the like, thereby forming a sheet including a plurality of adhesive layers 112. A sheet, e.g. an individual sheet, including a plurality of adhesive layers 112 may be formed and arranged between the intermediate layer 105 and the second polymer layer 104.

In various embodiments, the stack of sheets may be bonded. The bonded stack of sheets may include a plurality of chip card substrates 200.

In various embodiments, the bonded stack of sheets may be separated into a plurality of individual chip card substrates, for example into chip chard substrates 200 as shown in FIG. 2. In other words, the bonding may be performed on the stack of sheets, and thereafter, the bonded sheets may be separated into individual chip card substrates 200. The separating may for example be performed by means of cutting, laser cutting, stamping, sawing and the like.

Figure 3A:
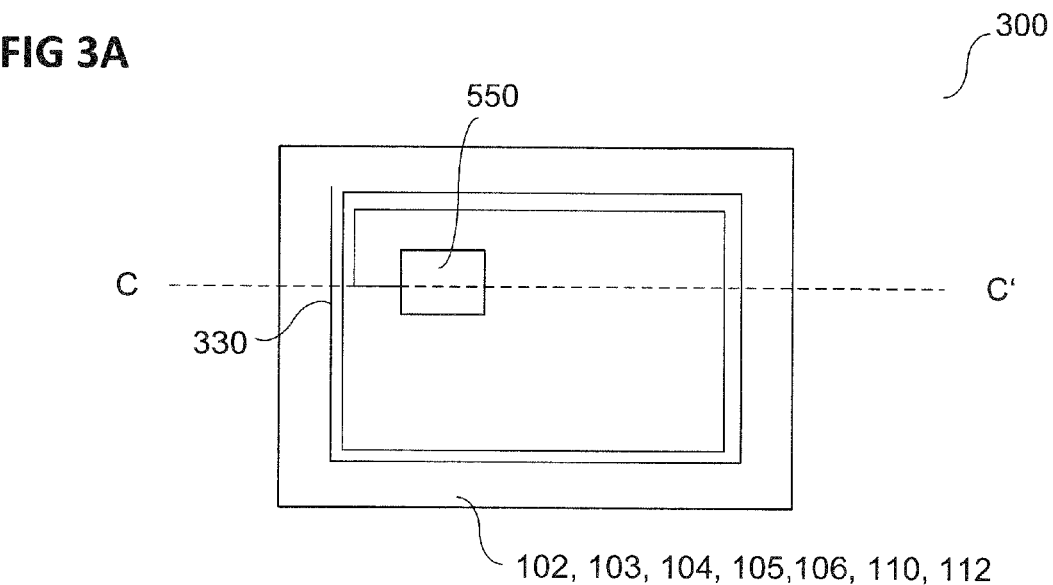
FIG. 3A shows a top view of a chip card according to various embodiments.
Figure 3B:
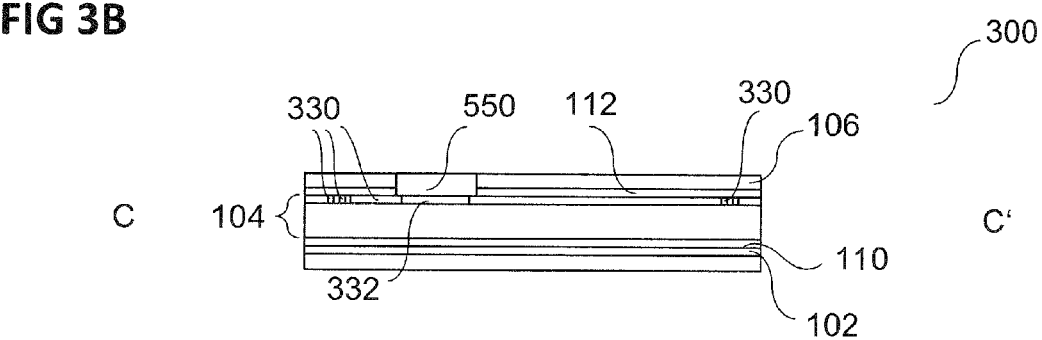
FIG. 3B shows a cross sectional view of the chip card of FIG. 3A along a line C-C'.

FIG. 3A shows a top view of a chip card 300 according to various embodiments, and FIG. 3B shows a cross sectional view of the chip card 300 of FIG. 3A along a line C-C'.

In various embodiments, the chip card 300 may have been formed using any of the methods, structures, layers, parts, materials, parameters etc. described in context with the embodiments in the previous figures. The chip card 300 may be considered as a chip card substrate that may include a chip 550, and that may further include additional structures that may be used with the chip 550, for example additional contact structures or support structures, etc. The chip card substrate may include a first polymer layer 102, a second polymer layer 104, and a third polymer layer 106. They may correspond to first, second, and third polymer layers 102, 104 and 106, respectively, as described in the previous embodiments. In various embodiments, the chip card 300 may further include at least one antenna 330 and a contact pad 332. The antenna 330 and the contact pad 332 may be in accordance with the antenna(s) 330 and the contact pad 332 described for previous embodiments.

According to various embodiments, the chip 550 may include at least one of an integrated circuit, an electronic circuit, a memory chip, an RFID chip (radio-frequency identification chip), or any other type of chip.

In various embodiments, the chip 550 may include a silicon bulk layer, e.g. a silicon substrate or a silicon wafer. The silicon bulk layer of the chip 550 may have a thickness in the range from about 10 µm to about 200 µm, e.g. in the range from about 20 µm to about 100 µm. e.g. in the range from about 30 µm to about 80 µm, e.g. in the range from about 50 µm, e.g. a thickness equal or less than 50 µm, e.g. 48 µm.

In various embodiments, the chip 550 may include at least one metallization layer.

In various embodiments, the chip 550 may be arranged on the same side of the antenna carrier 104 as the antenna 330. In various embodiments, the chip 550 may be arranged on the opposite side of the antenna carrier 104. In that case, the chip 550 may be electrically connected to the antenna 330 by means of a via, for example by means of a via through the antenna carrier 104, and by means of the contact pad 332.

In various embodiments, the chip 550 may include at least one chip contact. At least one of the at least one chip contact may provide an electrically conductive connection between the chip 550 and the at least one contact pad 332 arranged on the second polymer layer 104, as described above. In various embodiments, the chip 550 may include at least one chip contact. At least one of the at least one chip contact may provide the electrically conductive connection between the chip 550 and the antenna 330, e.g. via the at least one contact pad 332 arranged on the second polymer layer 104 as described above. In various embodiments, the chip 550 may include at least one chip contact 332. At least one of the at least one chip contact 332 may provide the electrically conductive connection between the chip 550 and an additional structure of the chip card 300, e.g. with an additional contact pad structure arranged on the back side of the second polymer layer 104.

In various embodiments, the chip 550 may have one or more chip contact pads. In case of more than one chip contact pad, the plurality of chip contact pads may be arranged in columns and lines, e.g. in two columns and two lines, e.g. in two columns and three lines, etc. The contact pads may be arranged in accordance with the standard ISO 7816. In various embodiments, the chip contact pads may include or essentially consist of a conducting material, e.g. a metal, a metal alloy, a metallic material, a metallic compound, including at least one of Cu, Al, Au, Ag, Pt, Ti, Ni, Sn, Zn, Pb, or any non-metal electrically conducting material. e.g. graphite. The chip contact pad(s) may be electrically connected to the chip by one or more of the at least one chip contacts 332. The chip contact pad(s) may have a lateral extension in the range of about 10 µm to about 1000 µm, e.g. about 200 µm to about 800 µm, e.g. about 300 µm to about 700 µm, e.g. about 400 µm to about 600 µm, e.g. about 500 µm. In various embodiments, the chip contact pads may be exposed, i.e. they may be facing towards an outside of the chip card 300, and the polymer layer, e.g. the third polymer layer, or more generally one of the first polymer layer 102 and the third polymer layer 106 that would be arranged to cover the chip 550, may have a cutout formed such that the chip contact pads are at least partially not covered by the polymer layer 102 or 106, such that the chip 550 may be electrically connected to a peripheral structure, e.g. to a data reader device, a programming device, and the like.

In various embodiments, the chip 550 may be attached to the antenna carrier 104 e.g. by use of an adhesive, e.g. a glue, by fusing, molding or soldering.

In various embodiments, the chip 550 may include a chip support structure in which the functional chip itself (i.e. the programmed and/or programmable semiconductor device), the chip contact pads, etc. are mounted. The glue structure or the solder structure may have a thickness in the range of about 1 µm to about 100 µm, e.g. about 10 µm to about 80 µm, e.g. about 30 µm to about 60 µm, e.g. about 50 µm, e.g. in a thickness equal or less than 50 µm.

FIG. 4 shows a process flow 600 for a method of forming a chip card substrate.

The method of forming a chip card substrate may include forming a first polymer layer including a first polymer material (in 4010). The method may further include forming an intermediate layer over the first polymer layer (in 4020), wherein the intermediate layer includes polyolefin including a plurality of micro pores. The method may further include forming an adhesive layer (in 4030), wherein the adhesive layer includes an adhesive. The method may further include forming a second polymer layer (in 4040), wherein the second polymer layer includes a second polymer material different from the first polymer material. The method may further include arranging the adhesive layer over the intermediate layer (in 4050). The method may further include arranging the second polymer layer over the adhesive layer (in 4060).

Various aspects of the disclosure are provided for devices, and various aspects of the disclosure are provided for methods. It will be understood that basic properties of the devices also hold for the methods and vice versa. Therefore, for sake of brevity, duplicate description of such properties may have been omitted.

A chip card substrate and/or a chip card may include or essentially consist of polymer materials. The chip card and/or the chip card substrate may form a layer stack including a plurality of layers, and each layer may include polymer material. In various embodiments, the chip card and/or chip card substrate may include layers that each include or essentially consist of the same polymer material. In this way, during a lamination process that may for example include heating and/or pressurizing the layers, the layers may soften and join more or less seamlessly to form a monolithically integrated structure. In other words, if the layers essentially consist of the same material, a monolithically integrated structure including a plurality of layers may be formed during the lamination process. The monolithically integrated structure may form a strong, durable connection between the layers.

The dual interface card may include an antenna. The antenna may be provided over or on an antenna carrier. The antenna may be formed by means of forming a metal layer over the substrate and etching the metal layer. In that case, the antenna carrier may include or essentially consist of polyethylene terephthalate (PET). Further layers of the chip card substrate may include or essentially consist of different polymer materials, for example polyvinyl chloride (PVC) or polycarbonate (PCB). The difference in materials may prevent a monolithic structure from forming, and it may furthermore prevent that the PET joins with the PVC and/or that the PET joins with the PCB.

An adhesive may be disposed on the PVC layer or on the PCB layer, for example between the PET layer and the PVC layer or between the PET layer and the PCB layer. However, only few adhesives may be configured to glue PET, and even fewer may be configured to glue PET to PVC and/or to PCB. An adhesive force of the adhesive exerted on the PET and the PVC and/or the PCB, respectively, may be so weak that the layer stack delaminates. If the chip card substrate was tested for its durability, it might fail. Furthermore, the additional layer of adhesive to be formed on the PVC and/or on the PCB layer and the costs associated with the formation thereof may increase the total manufacturing costs.

In various embodiments, a chip card substrate with improved resilience to delamination, also referred to as disintegration, and with low production costs may be provided.

In various embodiments, the antenna carrier, for example the PET antenna carrier, may be in contact, e.g. in physical contact, with a layer of adhesive, and an intermediate layer may be disposed in between the layer of adhesive and the PVC or PCB-layer.

In various embodiments, the antenna carrier may on both sides be in contact, e.g. in physical contact, with a layer of adhesive. An intermediate layer may be disposed over each of the layers of adhesive. A polymer layer, for example a PVC or PCB-layer, may be disposed over each of the intermediate layers.

In various embodiments, the intermediate layer may be configured to form a strong, durable connection with both, the adhesive, and the polymer material, for example the PVC and/or the PCB. By way of example, the intermediate layer may include or essentially consist of a material that is configured to form a strong, durable connection with both, the adhesive and the polymer material, for example with the PVC and/or with the PCB. In various embodiments, the intermediate layer may have a structure, for example a structure including a plurality of microscopic pores, also referred to as a micro porous structure. In various embodiments, the intermediate layer may include a material, for example polyolefin, that includes the plurality of microscopic pores, also referred to as micro porous material, for example micro porous polyolefin. The structure and/or the material of the intermediate layer may be configured to form a strong, durable connection with both, the adhesive and the polymer material, for example the PVC and/or the PCB. The adhesive may illustratively be considered as being anchored in the microscopic pores formed in the intermediate layer. The polymer material, e.g. the PVC and/or the PCB, may illustratively be considered as being anchored in the microscopic pores formed in the intermediate layer.

In various embodiments, the chip card substrate or the chip card may be formed from the layers by bonding the layers together, for example by bonding the PVC and/or PCB layer or layers, the intermediate layer or intermediate layers, the adhesive layer or adhesive layers and the antenna carrier, together. The bonding may for example be performed by means of laminating, for example by heating and/or by exerting pressure. The bonding of the layers may be so strong that the PET layer may not be separated from the intermediate layer or from the PVC and/or PCB layer without at least partially destroying the layers.

In various embodiments, a chip card substrate may be provided. The chip card substrate may include a first polymer layer including a first polymer material. The chip card substrate may further include an intermediate layer disposed over the first polymer layer and including polyolefin including a plurality of micro pores, an adhesive layer disposed over the intermediate layer and including an adhesive, and a second polymer layer disposed over the adhesive layer and including a second polymer material different from the first polymer material.

In various embodiments, the first polymer layer, the intermediate layer, the adhesive layer and the second polymer layer may form a bonded structure.

In various embodiments, the adhesive layer may include polyvinyl alcohol.

In various embodiments, the second polymer material may include polyethylene terephthalate.

In various embodiments, the first polymer material may include polycarbonate.

In various embodiments, the first polymer material may include polyvinyl chloride.

In various embodiments, the chip card substrate may further include another adhesive layer disposed over the second polymer layer and including an adhesive.

In various embodiments, the chip card substrate may further include another intermediate layer disposed over the another adhesive layer and including polyolefin including a plurality of micro pores.

In various embodiments, the chip card substrate may further include a third polymer layer disposed over the another intermediate layer and including a third polymer material different from the second polymer material.

In various embodiments, the first polymer layer, the intermediate layer, the adhesive layer, the second polymer layer, the another adhesive layer, the another intermediate layer and the third polymer layer may form a bonded structure.

In various embodiments, the another adhesive layer may include polyvinyl alcohol.

In various embodiments, the third polymer material may include polycarbonate.

In various embodiments, the third polymer material may include polyvinyl chloride.

In various embodiments, the third polymer layer may include the same material as the first polymer layer.

In various embodiments, the first polymer layer and the third polymer layer may be rectangular.

In various embodiments, the second polymer layer may include an antenna.

In various embodiments, the antenna may include aluminum.

In various embodiments, the second polymer layer may include a plurality of layers.

In various embodiments, the chip card substrate may be included in a chip card, wherein the chip card may further include a chip.

In various embodiments, a method of forming a chip card substrate may be provided. The method may include forming a first polymer layer including a first polymer material. The method may further include forming an intermediate layer over the first polymer layer. The intermediate layer may include polyolefin including a plurality of micro pores. The method may further include forming an adhesive layer. The adhesive layer may include an adhesive. The method may further include forming a second polymer layer. The second polymer layer may include a second polymer material different from the first polymer material. The method may further include arranging the adhesive layer over the intermediate layer and arranging the second polymer layer over the adhesive layer.

In various embodiments, the method may further include bonding the first polymer layer, the intermediate layer, the adhesive layer and the second polymer layer.

In various embodiments, the bonding may include laminating.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A chip card substrate, comprising:
a first polymer layer comprising a first polymer material selected from the group consisting of a polyimide, a polyvinyl chloride, a polycarbonate, and combinations thereof,
an intermediate layer disposed over the first polymer layer and comprising polyolefin comprising a plurality of micro pores;
an adhesive layer disposed over the intermediate layer and comprising an adhesive;
a second polymer layer disposed over the adhesive layer and comprising a second polymer material different from the first polymer material; and wherein the second polymer layer comprises an antenna.

2. The chip card substrate of claim 1,
wherein the first polymer layer, the intermediate layer, the adhesive layer and the second polymer layer form a bonded structure.

3. The chip card substrate of claim 1,
wherein the adhesive layer comprises polyvinyl alcohol.

4. The chip card substrate of claim 1,
wherein the second polymer material comprises polyethylene terephthalate.

5. The chip card substrate of claim 1, further comprising:
another adhesive layer disposed over the second polymer layer and comprising an adhesive;
another intermediate layer disposed over the another adhesive layer and comprising polyolefin comprising a plurality of micro pores;
a third polymer layer disposed over the another intermediate layer and comprising a third polymer material different from the second polymer material.

6. The chip card substrate of claim 5,
wherein the first polymer layer, the intermediate layer, the adhesive layer, the second polymer layer, the another adhesive layer, the another intermediate layer and the third polymer layer form a bonded structure.

7. The chip card substrate of claim 5,
wherein the another adhesive layer comprises polyvinyl alcohol.

8. The chip card substrate of claim 1, further comprising a third polymer layer comprising at least one material selected from a group consisting of polycarbonate, polyvinyl chloride, and combinations thereof, wherein the third polymer layer is disposed over the second polymer layer.

9. The chip card substrate of claim 1,
wherein the antenna comprises aluminum.

10. The chip card substrate of claim 1,
wherein the second polymer layer comprises a plurality of layers.

11. The chip card substrate of claim 1, wherein the thickness of the first polymer layer, the second polymer layer, and combinations thereof ranges from about 10 micrometers to about 1 millimeter.

12. A chip card including
a chip card substrate, comprising:
a first polymer layer comprising a first polymer material selected from the group consisting of a polyimide, a polyvinyl chloride, a polycarbonate, and combinations thereof,
an intermediate layer disposed over the first polymer layer and comprising polyolefin comprising a plurality of micro pores;
an adhesive layer disposed over the intermediate layer and comprising an adhesive;
a second polymer layer disposed over the adhesive layer and comprising a second polymer material different from the first polymer material; wherein the second polymer layer comprises an antenna; and
a chip.

* * * * *